Figure 1:
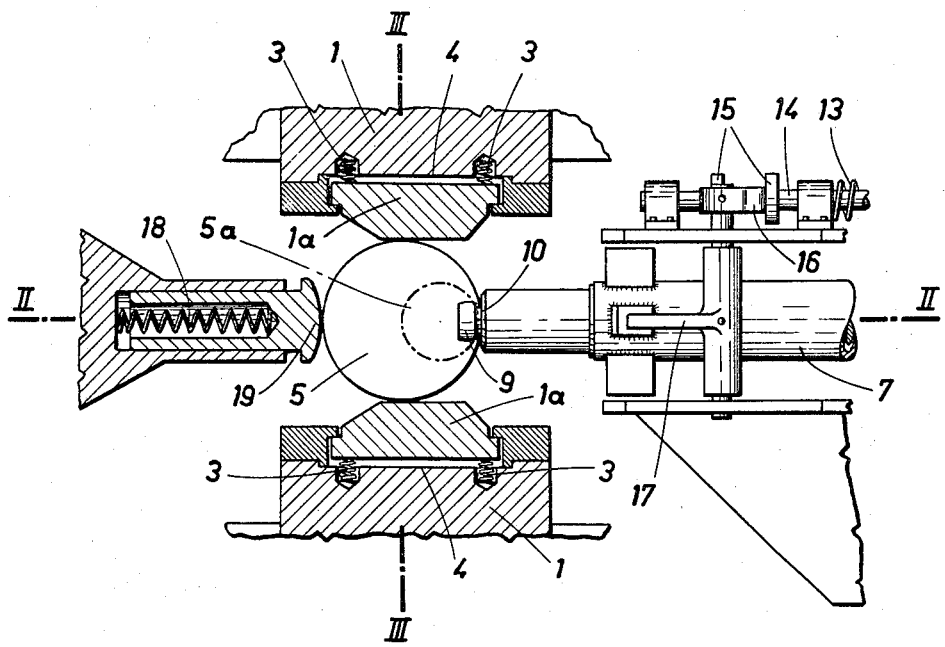

April 23, 1968   B. KRALOWETZ   3,379,047
FORGING PROCESS AND MACHINE

Filed Nov. 19, 1965   3 Sheets-Sheet 1

INVENTOR:
BRUNO KRALOWETZ
BY
Kurt Kelman
AGENT

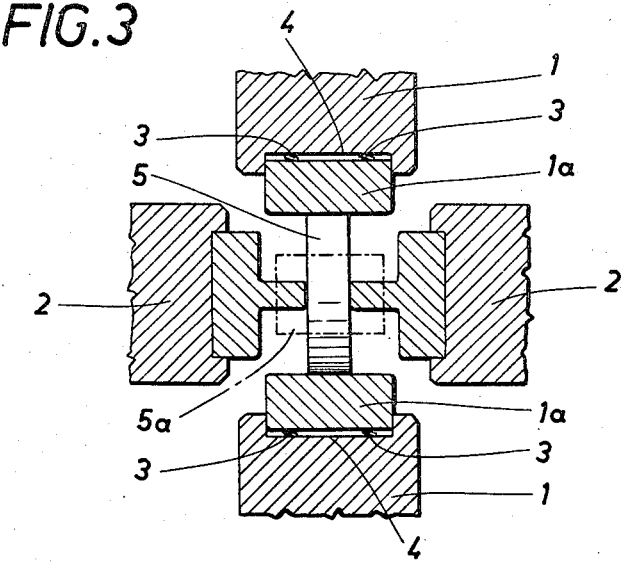
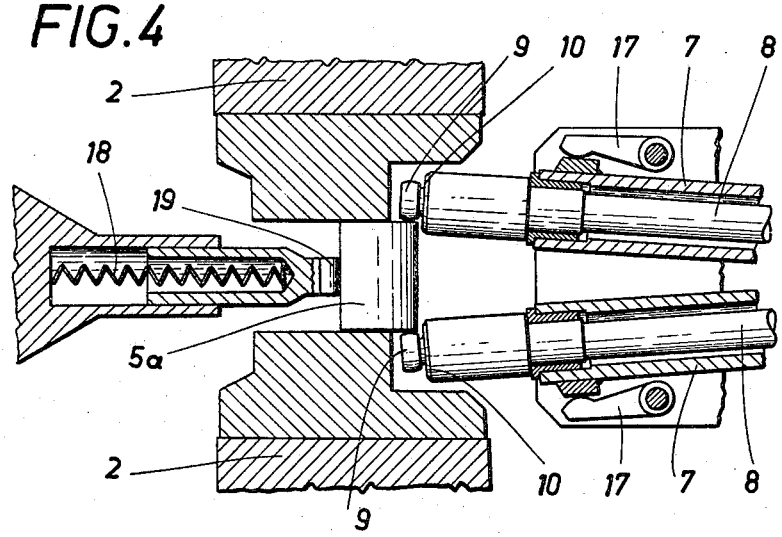

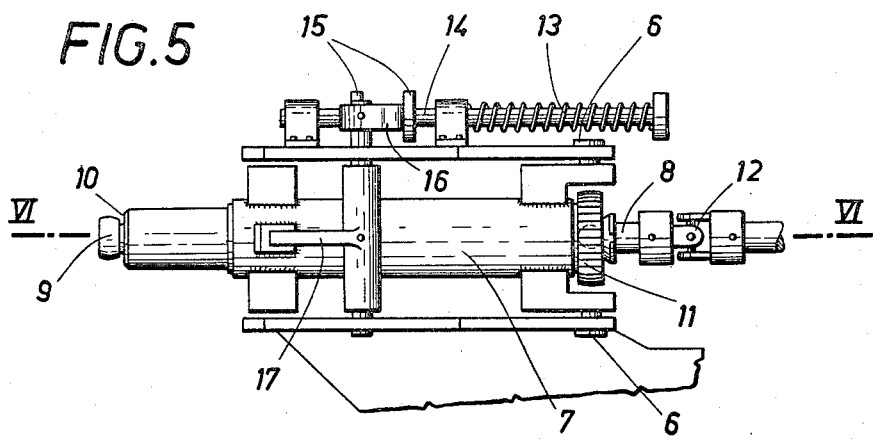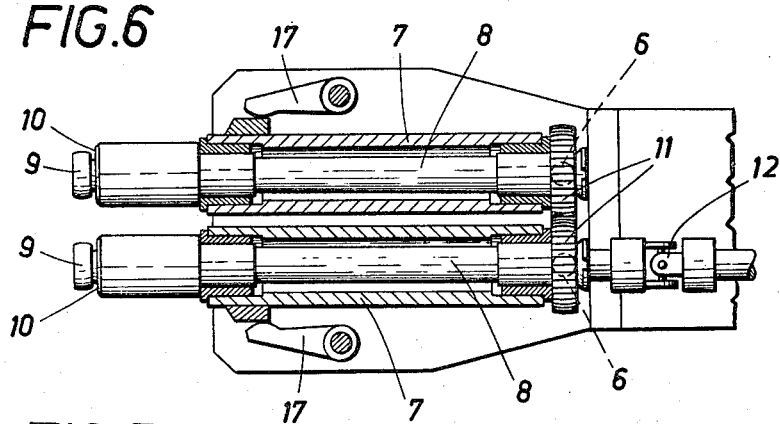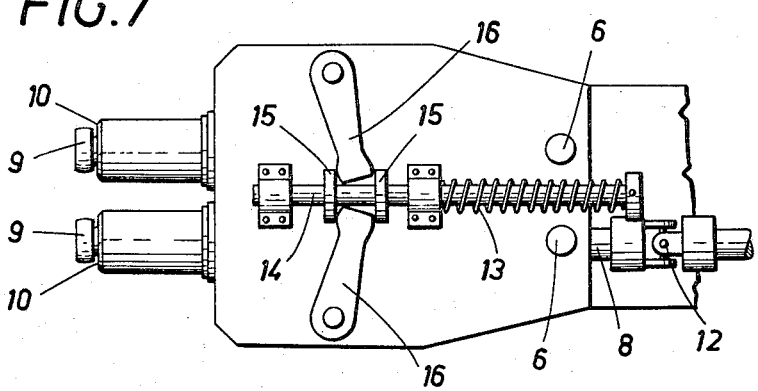

3,379,047
FORGING PROCESS AND MACHINE
Bruno Kralowetz, Weinleiten 142, St. Ulrich,
near Steyr, Austria
Filed Nov. 19, 1965, Ser. No. 508,652
Claims priority, application Austria, Jan. 20, 1965,
A 413/65
8 Claims. (Cl. 72—404)

Various disclike workpieces, such as disclike milling cutters or similar tools, must be forged on all sides in order to compact the material and obtain a finer structure. In the process previously employed for forging such discs or disclike workpieces, a suitable blank, which is usually of cylindrical shape but has a smaller diameter and a larger axial dimension than the finished workpiece, is shaped by hand with the aid of a simple forging hammer. It is obvious that this requires high skill. The lack of workers having such skill and the desire to increase the speed of work and to use automatic control leads to the problem of devising a process which enables a highly automatic forging of such disclike workpieces with the aid of known apparatus and machines. It is an object of the invention to solve this problem.

Forging machines are known which comprise four hammers that are angularly spaced apart by 90° and blow on each other or on the workpiece which is disposed between them. In these machines, the stroke position of the hammers, i.e., the distance between them, can be varied or controlled to obtain different cross-sectional dimensions of the workpiece. A so-called gripping head is provided for guiding and supporting the workpiece. This gripping head grips and workpiece at one end and feeds it between the hammers. At the same time, the gripping head may impart a rotation to the workpiece. As all four hammers blow radially against the workpiece and act only on the periphery of the workpiece, such forging machine cannot effect the reduction in length and a simultaneous increase in width or diameter, as is required in the forging of discs. Whereas it is also known to adjust each pair of opposite dies jointly with each other and independently of the other pair of hammers to vary the stroke position or spacing of said first-mentioned pair, this special adjustment has only the object of obtaining workpieces which have a cross-section that differs from a circle or square, e.g., a rectangular cross-section. As the longitudinal axis of the workpiece is again normal to the plane which is determined by the four hammers it is not possible to make disc-shaped workpieces.

The process according to the invention of forging disclike workpieces from preferably cylindrical blanks having a relatively small diameter and a relatively large axial dimension comprises shaping the blank with four hammers, one pair of which acts on the two end faces of the blank and the other pair of which acts on opposite sides of the periphery of the blank, which is rotated about its axis in known manner at the same time, the two pairs of hammers blowing simultaneously or in turn and the distance between the hammers which act on the end faces being gradually reduced whereas the distance between the hammers of the other pair is gradually increased. Previously, all four hammers had a blowing direction which was radial or approximately radial with respect to the axis of the workpiece so that a rotation of the workpiece enabled only a forging to a circular shape with simultaneous stretching of the workpiece. Now the workpiece is held between the hammers in such a manner that the blowing direction of one pair of hammers coincides with or is parallel to the axis of the workpiece. The blowing in the direction of the workpiece axis on the end faces of the workpiece results in the desired increase in the width of the workpiece. The hammers of the other pair blow at the same time on the periphery of the workpiece to impart a round shape to the workpiece particularly because the latter rotates about its axis. It will be understood that the stroke position of the hammers must be controlled so that they follow the increase in diameter and the decrease in the axial dimension of the workpiece. During the forging of circular workpieces, all four hammers were previously subjected to the same control. They were either jointly moved closer to the workpiece or away therefrom. A non-uniform or independent control of the two pairs of hammers was employed only during the forging of rectangular workpieces or the like.

In spite of its basic differences compared to the previous processes of forging circular workpieces, the forging process according to the invention has the advantage that it can be carried out on known forging machines when these are provided with a relatively simple accessory. Thus, the apparatus provided according to the invention for carrying out the process consists of a forging machine which comprises four hammers, which are spaced 90° apart and blow against each other, each pair of opposite ones of said hammers being jointly adjustable independently of the two other hammers to vary their stroke position or the distance between them, and is essentially characterized by a jaw-type workpiece holder, by which the workpiece, which is disposed between the hammers, is gripped at its end faces, said workpiece holder comprising at least one driven friction roller, which engages the surface of the workpiece and serves for rotating the workpiece, and by a holder-up, which faces the workpiece holder and is resiliently urged against the periphery of the workpiece. Contrary to the function of a known gripping head, the workpiece is not gripped from one end at its periphery but is gripped from one side of its periphery at the end faces so that the two end faces remain free for the action of one pair of hammers. It is not significant that these hammers do not blow on the entire end face but only on a part thereof because the workpiece is continuously rotated about its axis. This rotation is imparted to the workpiece by at least one friction roller, which contacts its end face or its periphery. Those elements of the workpiece holder which receive the workpiece between them must permit of such rotation. The holder-up serves to prevent a separation of the workpiece from the holder or a de-centering of the workpiece during the shaping of the workpiece. As the workpiece holder is jawlike, its function will not be adversely affected when it follows the decrease of the length of the workpiece. As the diameter of the workpiece increases, the holder-up is forced back. This holder-up may engage the periphery of the workpiece under spring pressure, hydraulic pressure or air pressure.

A particularly suitable design of the workpiece holder will be obtained if the same comprises two jaws, which can be spread apart and are urged toward each other by the force of a spring or the like, and two shafts, which are mounted in said jaws and coupled for rotation in mutually opposite directions, each of which shafts carries at its end protruding from the respective jaw a friction roller, preferably with a stop shoulder, one of said friction rollers being driven. In this case the friction rollers form at the same time the holding members between which the workpiece is gripped, and the stop shoulders prevent a movement of the workpiece from the holder-up toward the workpiece holder during the shaping of the workpiece.

The hammers which act on the periphery of the workpiece are suitably provided with dies, which are urged by springs away from a backing surface in the blowing direction. In this case, forging may be effected in that these hammers first engage and center the workpiece, whereafter the other pair of hammers, which act on the end faces, effect a deformation until the dies of the first pair of hammers snugly engage their backing surfaces, whereafter this pair of hammers shape the workpiece at the periphery thereof.

Figure 2:
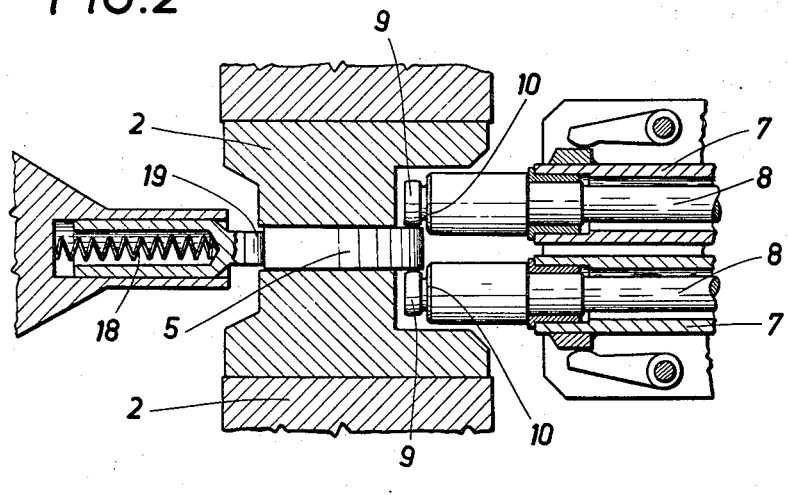

The subject matter of the invention is shown by way of example on the accompanying drawing, in which:

FIG. 1 is a view partly in section showing the most essential parts of a forging apparatus in the position assumed at the end of the forging operation, FIG. 2 is a sectional view taken on line II—II of FIG. 1, FIG. 3 is a sectional view taken on line III—III of FIG. 1 and showing the hammers and the workpiece, FIG. 4 is a view similar to FIG. 2 and shows the position at the beginning of work, and FIGS. 5 to 7 show the workpiece holder in a side elevation, a sectional view taken on line VI—VI of FIG. 5 and a top plan view.

Reference characters 1 and 2 identify the four hammers of a usual forging machine. These hammers are spaced 90° apart and blow against each other. Each of the pairs of hammers 1 and 2 can be adjusted independently of the other pair to vary the stroke position of the hammers. Thus the distance between the hammers 2 can be gradually decreased whereas the distance between the hammers 1 may be increased at the same time. The hammers 1 are provided with dies 1a. Each of these dies is urged away from an associated backing surface 4 in the blowing direction by a spring 3. The workpiece 5 is introduced in the form of a blank 5a between the hammers in such a manner that it is shaped by the hammers 1 at its periphery and by the pair of hammers 2 at both end faces. As the workpiece 5 or 5a performs at the same time a rotation about its axis, its axial dimension is decreased whereas its width or diameter is increased. At the same time, a circular shape is imparted to the workpiece by the pair of hammers 1. The pairs of hammers 1, 2 may blow at the same time or in turn. During the blow of the hammers 2, the hammers 1 hold the workpiece in the position shown in FIGS. 1 and 3. This results in an increase in width so that the dies 1a engage the backing surfaces 4. Thereafter the hammers 1 exert a shaping action on the periphery of the workpiece. This ensures a precise shaping.

A workpiece holder is provided which serves to hold and center the workpiece 5 or 5a and to rotate it at the same time while it is being shaped. This workpiece holder consists of two tubular jaws 7, which are pivoted on pins 6. In each of said jaws, a shaft 8 is rotatably mounted, which has an end portion protruding from the respective jaw 7 and having a friction roller 9 secured to it. Each of these rollers is formed with a stop shoulder 10. The two shafts 8 are coupled for rotation in mutually opposite directions by a spur gear train 11. One shaft is driven by a universal joint 12 and a transmission, not shown. A rod 14, which is loaded by a spring 13, is longitudinally slidably mounted over the jaws 7. Two discs 15 are secured to said rod. Two levers extend between and engage said two discs 15 from opposite sides. Each of said levers 16 is rigidly connected to another lever 17, which acts on one of the jaws 7. The spring 13 tends to push the rod 14 to the right in the drawing so that the levers 16, 17 are pivotally moved and the two jaws 7 are urged toward each other. Thus, the blank 5a (FIG. 4) can be gripped between the rollers 9 of the two jaws 7, which are caused by the spring 13 to follow the decrease of the axial dimension of the workpiece so that even the finished, thin workpiece 5 is still held with sufficient force. As the two rollers 9 rotate in opposite directions and firmly engage the two end faces of the workpiece, the latter is also rotated. A holder-up 19 loaded by a spring 18 faces the workpiece holder and acts on the periphery of the workpiece to ensure that the workpiece to be forged remains always between the rollers 9 during the shaping operation. It will be understood that the holder-up could be urged against the workpiece by a pneumatic or hydraulic pressure. Similarly, the spring 13 may be replaced by a hydraulic or pneumatic jack or the like.

What is claimed is:

1. A process of forging a disclike workpiece from a blank which is smaller in cross-section and larger in length than the forged workpiece, said process comprising rotating said blank about its axis, subjecting the end faces of said rotating blank to a series of blows performed by a first pair of hammers while gradually decreasing the distance between the hammers of said first pair at the end of each blow thereof, and subjecting opposite sides of the periphery of said rotating blank to a series of blows performed by a second pair of hammers while gradually increasing the distance between the hammers of said second pair at the end of each blow thereof.

2. A process as set forth in claim 1, in which said blank is cylindrical.

3. A process as set forth in claim 1, in which each of said two pairs of hammers perform said blows at the same time as the other of said pair of hammers.

4. A process as set forth in claim 1, in which said pairs of hammers perform said blows in alternation.

5. A forging machine for forging disclike workpieces from a blank which is smaller in cross-section and larger in length than the forged workpiece, said machine comprising four hammers spaced 90° apart and constituting two pairs of hammers, the hammers of each of said pairs being adapted to blow toward each other, means for adjusting the distance between the hammers of each of said pairs and the blow thereof independently of the distance between the hammers of the other of said pairs at the end of a blow thereof, a holder-up, a jaw-type blank holder spaced from said holder-up and adapted to grip such blank in a position in which said blank is engaged by said holder, its end faces are presented to one of said pairs of hammers and opposite sides of its periphery are presented to the other of said pairs of hammers, said blank holder comprising at least one friction roller, which is arranged to engage a blank in said position and operable to rotate said blank about its axis, and means arranged to urge said holder-up resiliently against said blank in said position.

6. A forging machine as set forth in claim 5, in which said blank holder comprises two jaws adapted to be spread apart, resilient means tending to urge said jaws toward each other, two shafts, each of which is rotatably mounted in one of said jaws, means operatively connecting said shafts for rotation in mutually opposite directions, each of said shafts having an end portion protruding from the respective jaw, two friction rollers, each of which is secured to one of said end portions, and means for driving one of said shafts.

7. A forging machine as set forth in claim 6, in which each of said friction rollers is formed with a stop shoulder.

8. A forging machine as set forth in claim 5, in which each of said hammers is formed with a backing surface and carries a die facing said backing surface opposite to the blowing direction of the respective hammer, and a spring tending to urge said die from said backing surface in a direction which is normal thereto.

References Cited

UNITED STATES PATENTS 2,656,739   10/1953   Mansfield _____ 72—399

CHARLES W. LANHAM, *Primary Examiner.*

R. D. GREFE, *Examiner.*